June 3, 1930.  H. A. WISE  1,761,698
AUTO AWNING
Filed Oct. 28, 1927
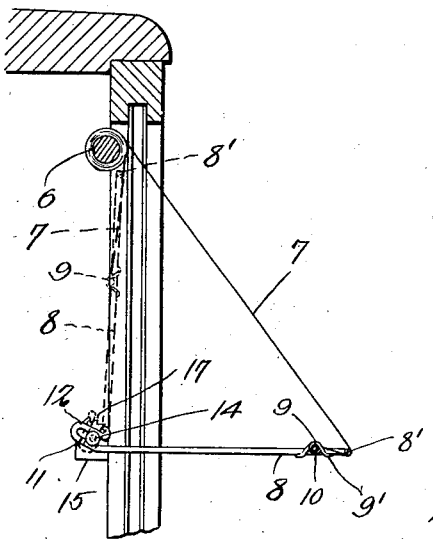
Fig. 1.
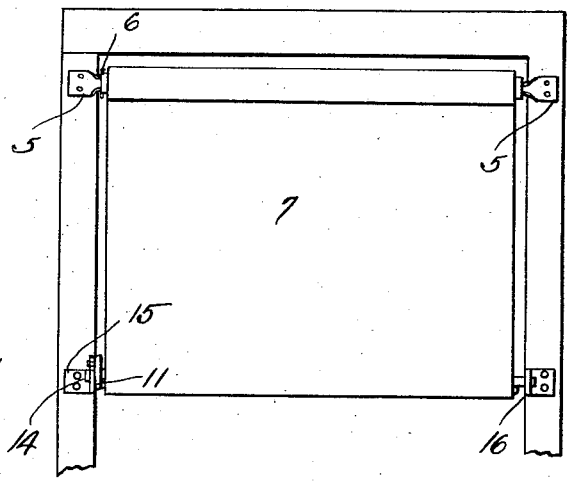
Fig. 2.
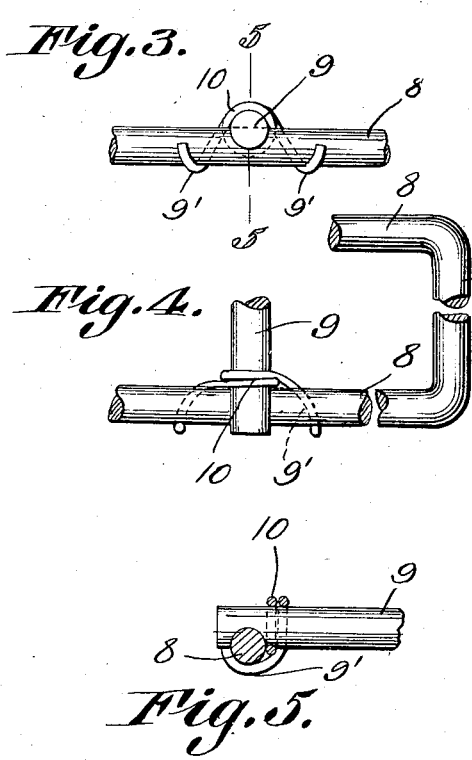
Fig. 3.
Fig. 4.
Fig. 5.
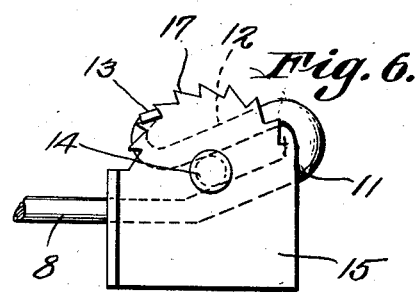
Fig. 6.
Fig. 7.
Inventor
Herbert A. Wise
By C. A. Snow & Co.
Attorneys.

Patented June 3, 1930

1,761,698

UNITED STATES PATENT OFFICE

HERBERT A. WISE, OF LUXORA, ARKANSAS

AUTO AWNING

Application filed October 28, 1927. Serial No. 229,443.

This invention has reference to awnings especially designed for use with windows of motor vehicles, the primary object of the invention being to provide an awning of this type which may be readily and easily operated and one which may be adjusted to various positions.

An important object of the invention is to provide an awning which will be held in its active or extended positions by the action of the spring roller on which the awning proper is rolled.

A still further object is to economize in the number of parts and to simplify the manufacture of and to provide fittings that can be adapted to any shape of window jambs.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:
Figure 1 is a vertical sectional view through a motor vehicle window illustrating an awning constructed in accordance with the invention as applied thereto.

Figure 2 is a front elevational view thereof.

Figure 3 is a fragmental elevational view illustrating the cross bar of the awning frame as secured in position.

Figure 4 is a plan view thereof.
Figure 5 is a sectional view taken on line 5—5 of Figure 3.

Figure 6 is an end elevational view illustrating the adjustable construction whereby the awning frame may be adjusted.
Figure 7 is a plan view thereof.

Referring to the drawing in detail, the reference character 5 designates brackets which are secured to the inner section of a motor vehicle window frame, and which support the spring shade roller 6, on which the awning 7 is wound, the spring acting to hold the awning 7 taut at all times.

The awning frame embodies a substantially U-shaped section including a pair of side members 8 and an end bar 8'. The rod 9 which is used in conjunction with the U-shaped section is provided with notches disposed adjacent to its ends to accommodate the sections 8 permitting the rod 9 to be moved longitudinally of the section 8 to adjust the awning.

The rod 9 is held in its positions of adjustment by means of the clips 10, each of which embodies a loop portion fitted over the rod 9 and end portions 9' curved to engage under the members 8 to set up a binding action between the members 8 and rod 9.

The outer or free end of the awning proper 7 is provided with a hem through which the rod 9 is passed, so that the awning proper is firmly secured to the rod 9.

As clearly shown by Figure 1, one of the side members 8 is provided with an upwardly extended portion 11 and a forwardly extended portion 12 terminating in a laterally extended finger 13, the forwardly extended portion lying in spaced relation with the upwardly extended portion 11 to accommodate the headed bolts 14 that secure the awning frame in position, the side members 8 of the frame being supported by the brackets 15 and 16 arranged at opposite sides of the window frame.

The bracket 15 is formed with teeth 17 that cooperate with the finger 13 of the forwardly extended portion 12 to hold the awning in its adjusted positions. At the opposite side of the awning is a bar that has a right angled extremity extended into an opening of the bracket 16 whereby the frame is pivotally supported.

Due to the construction shown and described, the awning frame may be swung to a vertical position and the awning 7 may be moved longitudinally of the side members 8, to the end that the awning proper 7 may be used as a sunshade or curtain.

It will also be seen that due to this construction the awning frame may be pulled downwardly and the finger 13 disengaged from the teeth of the bracket 15, whereupon the awning frame may be moved to a proper adjusted position and released, the tension of the spring of the roller 6 will act to pull the outer extremity of the frame upwardly setting up a wedging action between the finger 13 and bracket member 15, the tension of the awning proper acting to hold the awning frame against movement.

I claim:

In an awning, a frame having side members, one of the side members having its end disposed at an oblique angle with respect to the main portion thereof, the end of said side member being extended forwardly in parallel spaced relation with the side member, providing an elongated space, a bracket associated with one side member of the frame, a pin extending laterally from the bracket and disposed in the space of the side member associated therewith to adjustably support the frame, a laterally extended finger formed at one end of the side member, and teeth on the bracket to be engaged by the finger to hold the frame in its positions of adjustment.

In testimony that I claim the foregoing as my own, I have hereto affixed my signature.

HERBERT A. WISE.